United States Patent [19]

Kremer et al.

[11] Patent Number: 5,267,010

[45] Date of Patent: Nov. 30, 1993

[54] LASER RADAR DEVICE

[76] Inventors: Richard M. Kremer, 13033 Abra Dr., San Diego, Calif. 92128; Eric J. Korevaar, 5771 Lodi St., San Diego, Calif. 92117; Scott H. Bloom, 13060 Callcott Way, San Diego, Calif. 92130

[21] Appl. No.: 710,356

[22] Filed: May 31, 1991

Related U.S. Application Data

[63] Continuation-in-part of Ser. No. 456,975, Dec. 26, 1989, Pat. No. 5,029,999.

[51] Int. Cl.$^5$ .................. G01C 3/08; G01P 3/36
[52] U.S. Cl. .......................... 356/5; 356/28
[58] Field of Search .......................... 356/5, 28.5

[56] References Cited

U.S. PATENT DOCUMENTS

| | | | |
|---|---|---|---|
| 3,790,278 | 2/1974 | Buczek et al. | 356/5 |
| 3,942,890 | 3/1976 | Malone | 356/5 |
| 4,167,329 | 9/1979 | Jelalian et al. | 356/5 |
| 4,822,164 | 4/1989 | Breen | 356/28.5 |
| 5,029,999 | 7/1991 | Kremer et al. | 356/5 |

Primary Examiner—Stephen C. Buczinski
Attorney, Agent, or Firm—John R. Ross

[57] ABSTRACT

A laser radar system capable of measuring windspeed to within 1 m/s at distances in the range of 10 km. The system comprises two Faraday atomic line filter/detectors combinations, a first filter-detector which consist of a metal vapor cell located between crossed polarizers. A magnetic field is applied to the cell which Zeeman splits the energy levels resulting in different absorption lines for left and right circularly polarized light. Near these lines the filter acts as a Faraday rotator providing rotary power only in the vicinity of an absorption line, which provides the 90 degree rotation necessary to pass the second polarizer. At higher fields and vapor densities multiple rotations lead to rapid modulations in the transmission spectrum. Away from the absorption line the filter provides an out of band rejection that is determined by the extinction ratio of the crossed polarizers. By tuning the temperature and the magnetic field in each Faraday filter sharply crossing response curves can be produced. A preferred lasing frequency range is a frequency range covering a portion of one of the slopes of the peak of the first filter and a portion of one of the opposite direction slopes of one of the peaks of the second filter. Within this range an increase in the frequency of signal light will result in a greater fraction of the light detected by one filter-detector and a smaller fraction detected by the other filter-detector and a decrease in the frequency of the signal light will have the opposite effect. In a preferred embodiment of this invention laser pulses from a laser operating near the midpoint of this preferred frequency range are beamed at a target which could be a windy portion of the atmosphere. Backscattered Doppler shifted light from aerosols and particles in the atmosphere are collected by a telescope and split into two parts, one part being directed to each filter-detector. The intensities of the light detected by the filter-detectors are compared and the relative magnitudes are used to determine the windspeed in the direction of the laser beam. Pulses can be made very short and the travel time of the light is used to determine the range so that a map of windspeed as a function of range is provided in the direction of the laser beam.

8 Claims, 7 Drawing Sheets

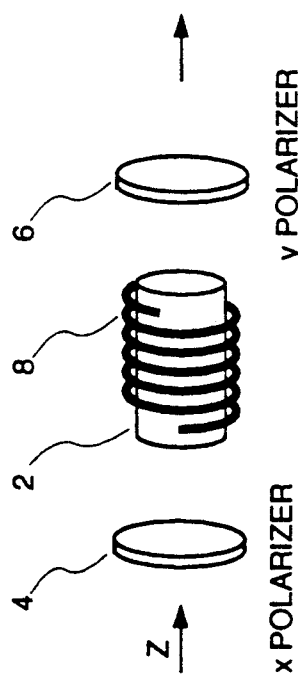
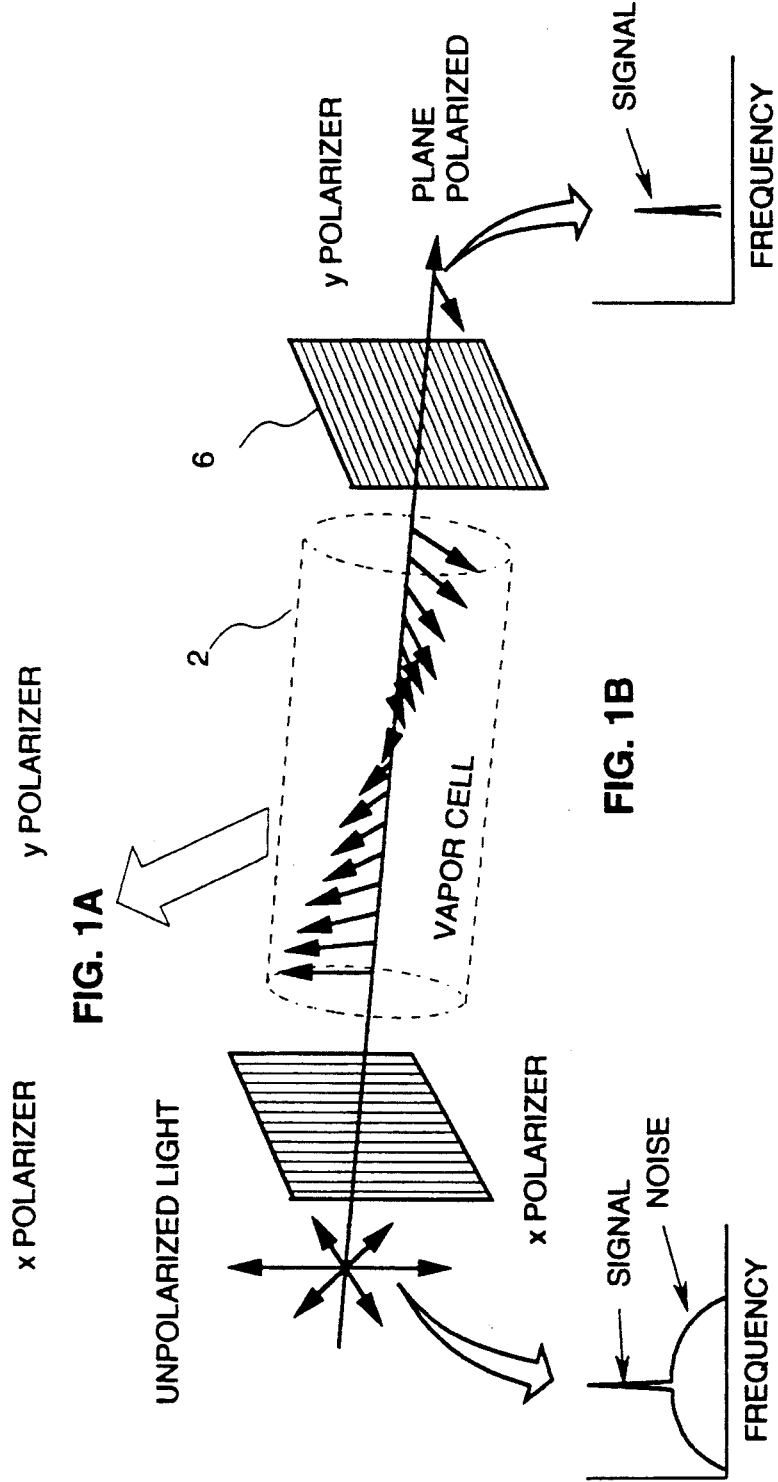

LASER RADAR DEVICE

This is a continuation-in-part of application Ser. No. 07/456,975, filed Dec. 26, 1989, now U.S. Pat. No. 5,029,999. This invention relates to radar devices and in particular to laser radar devices useful for detection of windspeed.

BACKGROUND OF THE INVENTION

It is known that windspeed can be determined by transmitting a laser pulse into the wind and measuring the Doppler frequency shift of the light backscattered from aerosols and particles moving with the wind. The velocity of the wind $V_W$ in the direction of the laser pulse is:

$$v_w = \frac{f_s \lambda}{2}$$

where $f_s$ is the Doppler frequency shift and $\lambda$ is the wavelength of the laser pulse. Four proposed windspeed detection systems are discussed by Menzies in "Doppler Lidar Atmospheric Wind Sensors: A Comparative Performance Evaluation for Global Measurement Applications from Earth Orbit"; Applied Optics, Vol. 25, No. 15, Aug. 1, 1986. The principle challenge inherent in these systems is isolating the laser backscatter signal from background noise. These proposed systems utilize either a heterodyne detection system or a Fabry-Perot filter.

SUMMARY OF THE INVENTION

The present invention provides a laser radar system capable of measuring windspeed to within 1 m/s at distances in the range of 10 km. The system comprises two Faraday atomic line filter/detector combinations. Each filter-detector consists of an atomic vapor cell located between crossed polarizers. A magnetic field is applied to the cell which Zeeman splits the energy levels resulting in different absorption lines for left and right circularly polarized light. Near these lines the filter acts as a Faraday rotator providing rotary power only in the vicinity of an absorption line, which provides the 90 degree rotation necessary to pass the second polarizer. At higher fields and vapor densities multiple rotations lead to rapid modulations in the transmission spectrum. Away from the absorption line the filter provides an out of band rejection that is determined by the extinction ratio of the crossed polarizers. By tuning the temperature and the magnetic field in each Faraday filter sharply crossing response curves can be produced. A preferred lasing frequency range is a frequency range covering a portion of one of the slopes of a peak of the first filter and a portion of one of the opposite direction slopes of one of the peaks of the second filter. Within this range an increase in the frequency of signal light will result in a greater fraction of the light detected by one filter-detector and a smaller fraction detected by the other filter-detector and a decrease in the frequency of the signal light will have the opposite effect. In a preferred embodiment of this invention laser pulses from a laser operating near the midpoint of this preferred frequency range are beamed at a target which could be a windy portion of the atmosphere. Backscattered Doppler shifted light from aerosols and particles in the atmosphere are collected by a telescope and split into two parts, one part being directed to each filter-detector. The intensities of the light detected by the filter-detectors are compared and the relative magnitudes are used to determine the windspeed in the direction of the laser beam. Pulses can be made very short and the travel time of the light is used to determine the range so that a map of windspeed as a function of range is provided in the direction of the laser beam.

BRIEF DESCRIPTION OF THE DRAWINGS

FIGS. 1-1D is a drawing of a Faraday filter.

DESCRIPTION OF FARADAY FILTER

Figure 1:
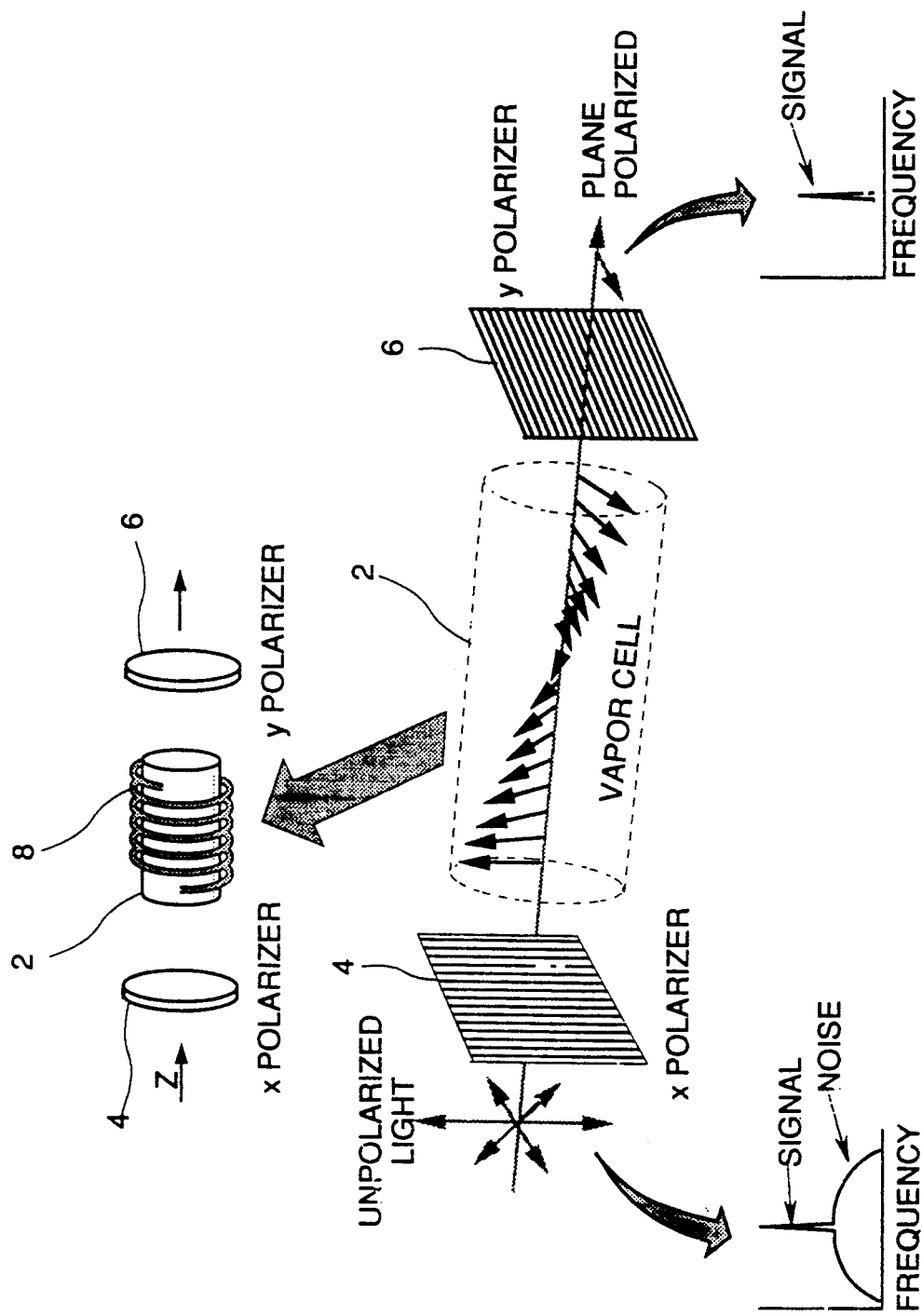

FIG. 1 is a simplified diagram depicting the operation of a Faraday filter. The Faraday filter consists of an atomic vapor in a cell 2 located between crossed polarizers 4 and 6. A magnetic field is applied to the cell by coil 8 which Zeeman splits the energy levels resulting in different absorption lines for left and right circularly polarized light. Near these lines the filter acts as a Faraday rotator providing rotary power only in the vicinity of an absorption line, which provides the 90 degree rotation necessary to pass the second polarizer 6. At higher fields and vapor densities multiple rotations lead to rapid modulations in the transmission spectrum. Away from the absorption line the filter provides an out of band rejection that is determined by the extinction ratio of the crossed polarizers. By tuning the temperature and the magnetic field in each Faraday filter sharply crossing response curves can be produced.

Figure 2:
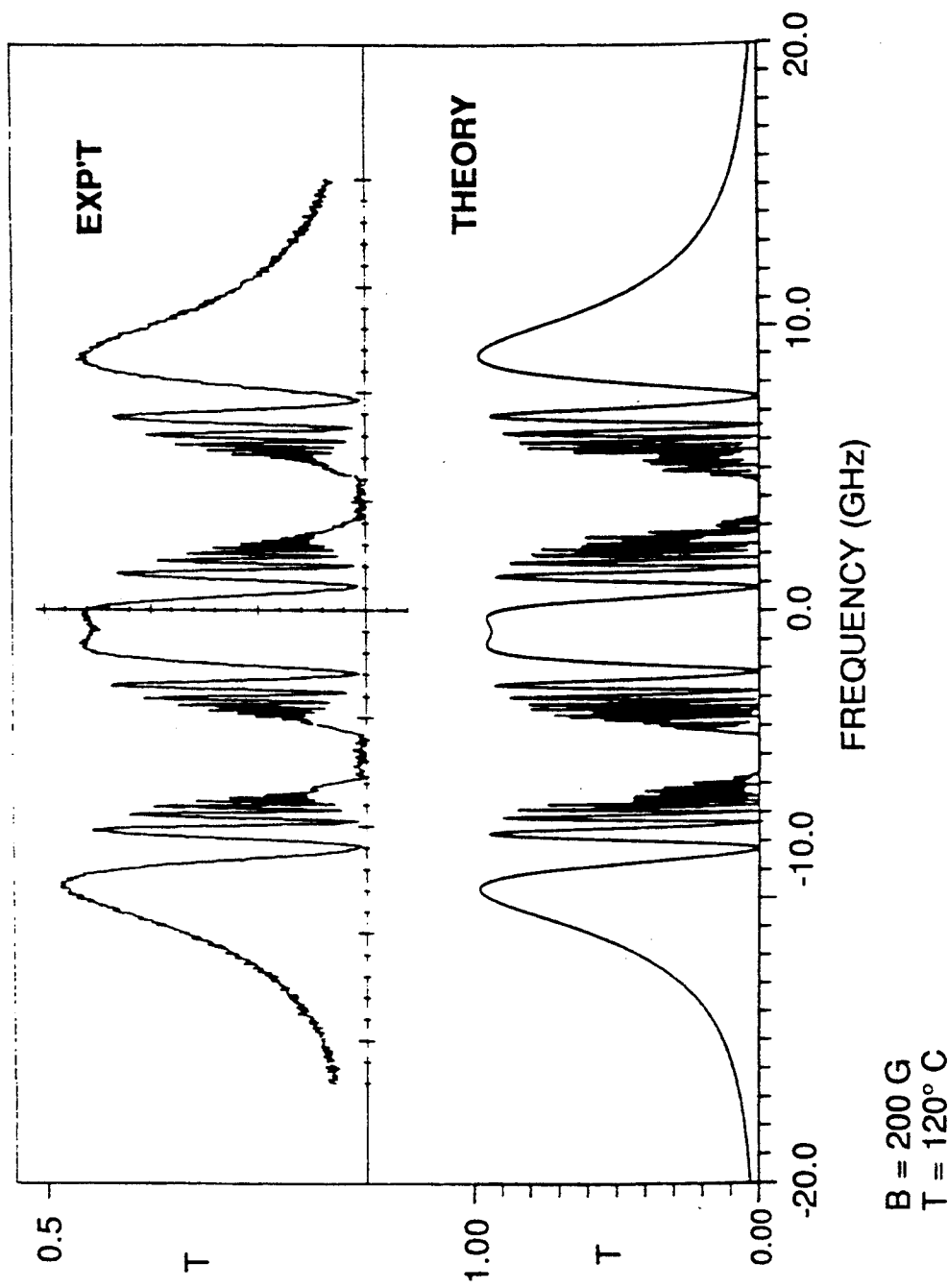
FIG. 2 are transmission curves for a Faraday filter.

FIG. 2 shows both experimental and theoretical curves for a cesium based Faraday filter. The sharp structures in the curves are due to light being rotated through multiples of 90 degrees before passing through the Faraday filter. By tuning the temperature and magnetic field of each Faraday filter, two of the sharp features can be made to cross with approximately opposite slopes (+/−). By tuning the signal laser to the crossing point of the two detector response curves the wind speed may be measured. The transmitted laser is Doppler shifted by the moving aerosols, causing a change in the wavelength of the backscattered light received by each detector. Since the response curves have opposite slopes one detector increases its transmission and the other decreases its transmission. If the scatterer were moving in the opposite direction the reverse would be true. In this way the radial component of the wind velocity (speed) may be measured.

EXPERIMENTAL SETUP

Figure 3:
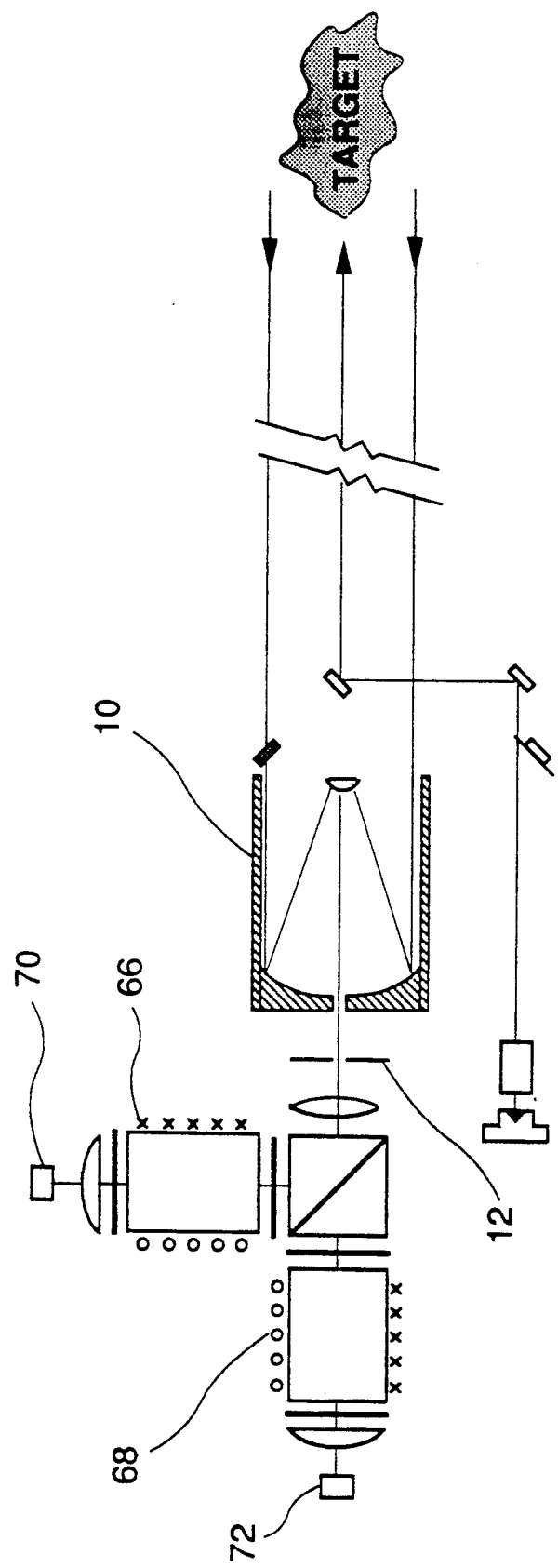
FIG. 3 is a drawing explaining an experimental setup.

The experimental setup for measuring flowing aerosols with the windspeed detector is shown in FIG. 3. The interaction region (defined by the combination the obscuration of the telescope 10 and the field stop (pinhole) 12) is located about 5 meters from the front of the telescope, with a width of about 8 mm and a length of about 1 meter. A high power current and temperature stabilized 852 nm, 50 mW single mode (10 MHz linewidth) diode laser was intersected coaxially with the interaction region. The laser diode beam was modulated with a line synched (to reduce 60 Hz noise) chopper in order to scatter some non-Doppler shifted light back into the telescope, providing a reference signal. The collected light passed through a 0.030" pinhole and was collimated to a 1 cm diameter spot size. A 50/50 non-polarizing beam splitter fed about half of the collected light into each Faraday filter 66 and 68. The near resonant light passing through the Faraday filters was detected by avalanche photodiodes 70 and 72 and associated amplifying electronics located at the output of each filter. After passing through the interaction region the transmitted laser beam was sent to a beam dump (not shown) about 15 meters away. The interaction region was surrounded by a 3 meter long 4 inch diameter ABS pipe to which a blower, capable of generating air speeds of >25 meters/sec, was attached. Our laboratory did not have enough aerosol present for us to see a return signal off of pure air. In order to increase the amount of signal return the air was seeded with ordinary cigar smoke at the intake of the blower. The amount of light scattered into the telescope by the chopper was made about equal to the amount of return received from the aerosol. This insured that the detectors were operating in a linear regime.

Figure 4:
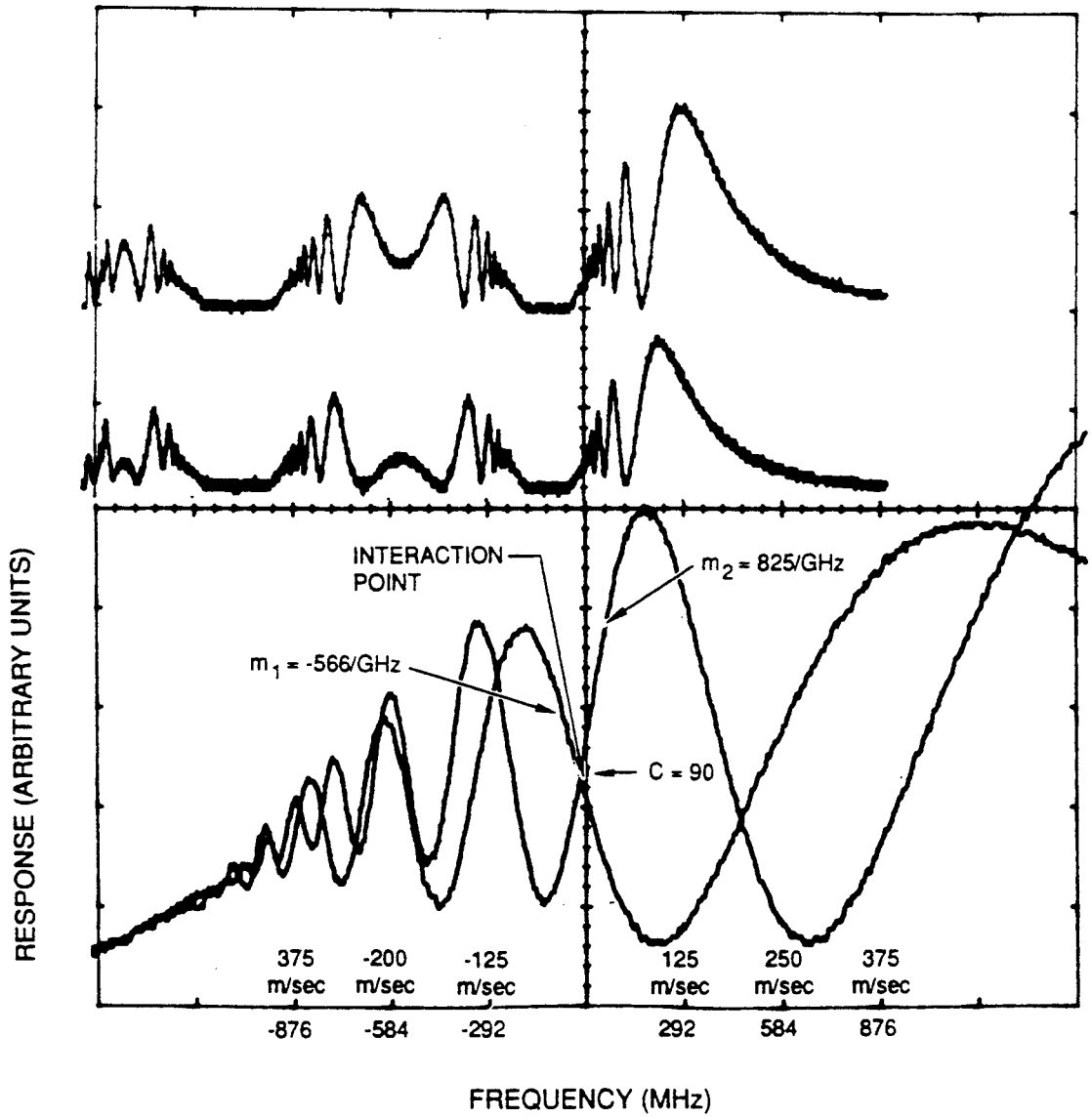
FIG. 4 are oscillogram traces resulting from an experiment.

FIG. 4 shows an oscillogram of the response of each Faraday filter as the laser diode wavelength is changed by about 30 GHz by ramping the diode laser current. The top section of FIG. 4 represents the response of filter 68 and filter 70 plotted separately and on the bottom section, both filtered responses are multiplied by 10 on the absussa and superimposed on each other. The filters were operated at 120° C., which corresponds to a cesium density of about $4.7 \times 10^{13}/\text{cm}^3$. Filter 68 and filter 70 were operated at fields of 120 G and 130 G in order to produce the crossed response as a function of wavelength seen at the vertical hatched line in the figure. This operating point agreed well with our computer predictions for the Faraday filter response curves. The inset in FIG. 4 shows the laser scanning over a broader wavelength range that includes two Cs $6s_{\frac{1}{2}}$ hyperfine absorption peaks. Since the Cs peaks are known to be 9.2 GHz apart this provides a calibration scale so that the slopes of the detector curves may be accurately determined. The range of linearity for this crossing region is about $\pm 100$ MHz. This gives a slope of 9.17/GHz for detector 1 and a slope of $-6.28$/GHz for detector 2.

Using the apparatus, a windspeed of 13.4 meters/sec was measured. In order to check this result, a small wind meter, Turbometer, by Davis Instruments, Hayward, Calif. (resolution ~0.1 m/sec) was used to calibrate the tunnel. The windspeed using the Turbometer measured 14.9 meters/sec. By placing the meter in the windtunnel the flow was obstructed and therefore the speed measured by the Turbometer is higher than the actual speed. Using the frontal area of the Turbometer to correct for a new flow aperture, the measured speed was 13.3 meter/sec in excellent agreement with the laser based system described in this disclosure.

System for Measuring Windspeed

Figure 5:
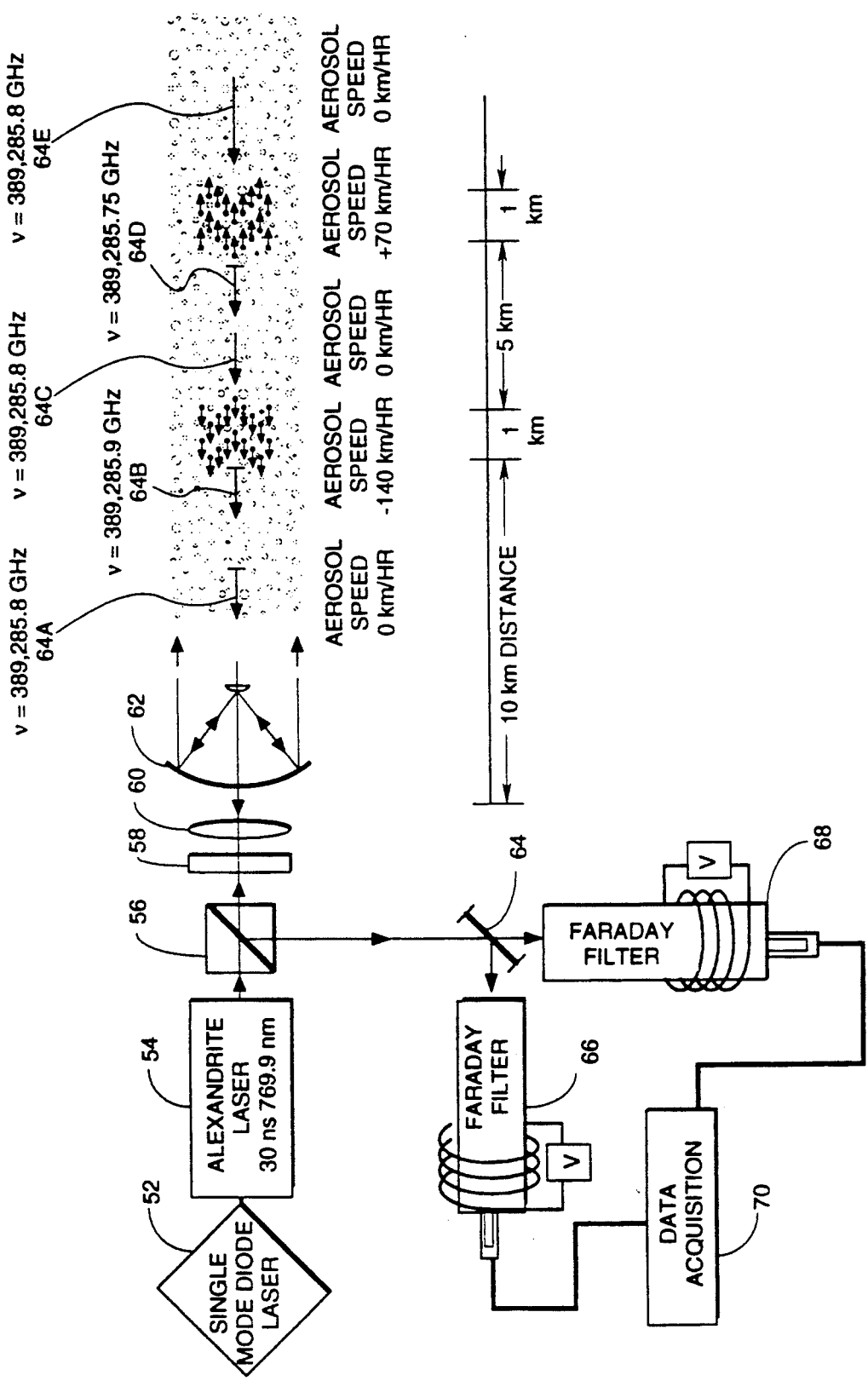
FIG. 5 is a sketch explaining the operation of the present invention.

A system for measuring windspeed is shown in FIG. 5.

A single mode diode laser 52 provides photons at 769.9 nm. This laser provides the seed photons for a flashlamp pumped, narrowband, Q-switched, Alexandrite laser 54. The pulses from laser 54 are 0.5 Joule and the repetition rate is 20 pulses per second. This laser system is available commercially from Light Age, Inc. and is marketed as PAL system. The nominal frequency is controllable within the range of interest, i.e. around 389,285.6 GHz and the bandwidth is less than 0.1 GHz.

The pulses from laser 54 passes through polarizing beamsplitter cube 56, and its polarization is rotated 45° by $\pi/4$ Faraday rotator 58. It then passes through relay optics 60 to $\frac{1}{2}$ meter aperture telescope 62 which directs the beam to the desired azimuth and elevation angles. A portion of the beam is immediately retro-reflected into Faraday filter detectors 66 and 68 to provide a zero Doppler shift calibration. (The backscattered photon's polarization is rotated an additional 45° so that the received signal is directed to the detectors by the polarizing beamsplitter cube 56.).

The laser pulses travel through the atmosphere and a small portion is backscattered from aerosols and particles in the atmosphere as indicated by the large arrows 64A, 64B, 64C, 64D, and 64E shown in FIG. 5. Where the speed of the air in the direction of the beam is zero as depicted for 64A, 64C and 64E the frequency of the backscattered light is the same as the transmitted beam i.e., 389,285.6 GHz. At 64B the P air is depicted as moving with a speed of 140 Km/Hr (38.9 m/s) in a direction opposite the beam. The light backscattered from aerosols in this section of the atmosphere will be increased in frequency by approximately 0.1 GHz or 100 MHz this results from:

$$f_s = \frac{2v_w}{\lambda} = \frac{(2)(-140 \times 10^3 \text{ m})}{(769.9 \times 10^{-9} \text{ m})(3600 \text{ s/hr})} = 100 \text{ MHz}$$

Similarly, at 64 D the aerosols are depicted as moving in the direction of the laser pulses at a speed of 70 Km/Hr and as a result the backscatter would be shifted in frequency downward by 50 MHz. The Doppler shifted frequencies are indicated by on FIG. 5.

Since location 64B is about 10 Km from the laser it will take about $66 \times 10^{-6}$ sec for the light to travel from the laser to location 64B and back to detectors A and B. The time to get to location 64D and back is about $100 \times 10^{-6}$ sec. The absolute value of the returning signal will decrease roughly by the second power of the distance traveled and an exponential term that depends upon the clarity of the air.

The backscatter light is collected by telescope 62 and directed through relay optics 60, rotator 58, beamsplitter 56 to 50—50 beamsplitter 64 where one half of the beam is directed to detector 66 and one half is directed to detector 68. The outputs of the two filter detectors feed data acquisition unit 70 which compares the outputs as a function of time to determine the windspeed as a function of radial distance from the detector system.

Figure 6A:
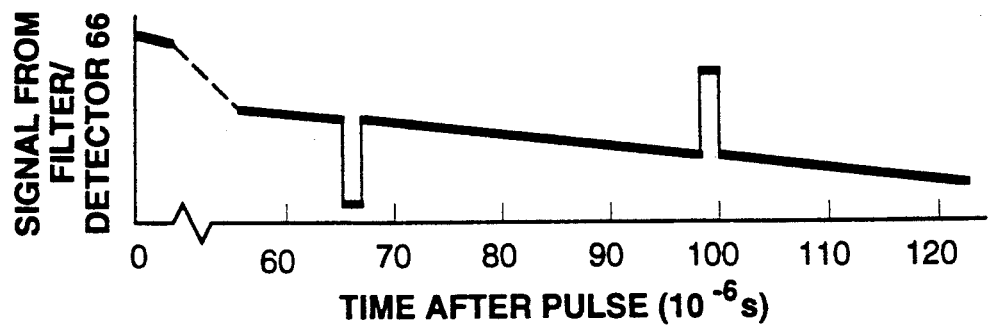
FIGS. 6A-6C is a sketch showing qualitatively the treatment of experimental data.
Figure 6B:
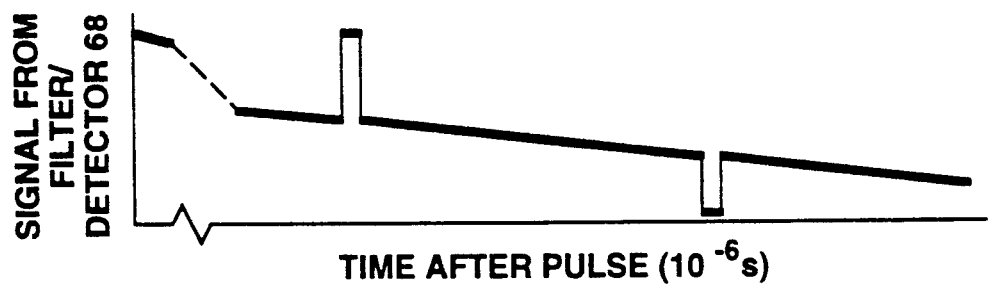
Figure 6C:
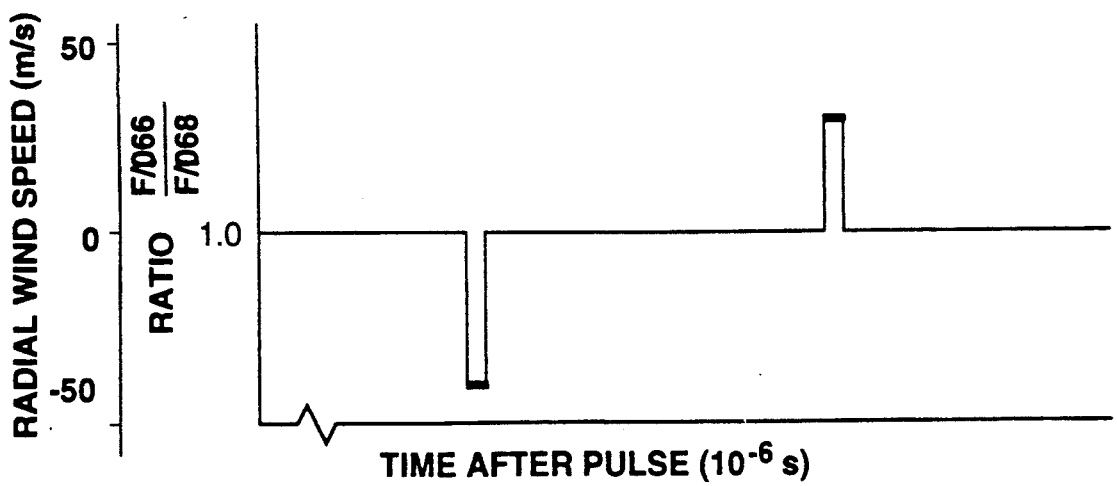

Qualative plots of the outputs of filter-detector 66 and 68 and the ratio of the signal from filter-detector 66 to the signal from filter-detector 68 are shown in FIG. 6.

For our preferred embodiment 20 ns data gates are correlated with the pulse rate of 20 Hz. Since the pulse length of this preferred system is about 30 ns, range can be determined to within an accuracy of about 15 feet.

The unique aspect of this device is the precision frequency measurements possible with a pair of detectors at least one of which is Faraday shifted. There are several other applications for these detectors. Windspeed measurement has already been mentioned, so it is clear that anything that scatters light can have its velocity determined with this invention. Also long range optical communication is an obvious extension of the technology, only photons in-band are detected and the band may be tuned via the magnetic field. Covert point-to-point optical communication is another obvious extension. The crossover point between the detectors may be utilized for detecting small modulations in a laser beam. The frequency modulations are easily decoded into data but no other type of detector can receive them.

The reader should construe the above described embodiment of this invention as examples and the scope of this invention shall be determined by the appended claims and their legal equivalents.

We claim:

1. A speed determining laser radar device comprising:
   a. a laser means for transmitting to a target or targets a narrowband laser beam, defining a nominal wavelength of said transmitted beam;
   b. a first Faraday filter-detector comprising:
      1) a first polarizer,
      2) a second polarizer aligned 90 degrees with respect to said first polarizer,
      3) a first sealed chamber containing an atomic vapor having at least one absorption peak at or near said nominal wavelength, each peak defining a leading edge providing increased absorption with increasing frequency and a trailing edge providing decreased absorption with increasing frequency,
      4) a first magnetic field means for imposing a magnetic field in said atomic vapor in order (a) to cause the rotation of the polarization of reflected light from said laser beam and (b) to align a trailing edge of one of said at least one absorption peak to said nominal wavelength and;
      5) a first light detector means;
   c. a second Faraday filter-detector comprising:
      1) a third polarizer,
      2) a forth polarizer aligned 90 degrees with respect to said third polarizer,
      3) a second sealed chamber containing an atomic vapor having at least one absorption peak at or near said nominal wavelength, each peak defining a leading edge and a trailing edge,
      4) a second magnetic field means for imposing a magnetic field in said atomic vapor in order (a) to cause the rotation of the polarization of reflected light from said laser beam and (b) to align a leading edge of one of said at least one absorption peak to said nominal wavelength and;
      5) a second light detector means;
   said first Faraday filter-detector permitting increased passage of light with increased frequency of light within said narrow frequency band and said second Faraday filter-detector means permitting decreased passage of light with increased frequency of light within said narrow frequency band; and
   d. a data acquisition and comparison means for acquiring and comparing the outputs of said first and second filter-detector to determine the speed of said target or targets based on frequency shift from said nominal wavelength of the laser light reflected from said target or targets.

2. A laser radar as in claim 1 wherein said laser beam is a pulsed beam and said data acquisition and comparison means is further adapted to determine the range of said target or targets based on the period of time required for light from said laser means to said target or targets and back to said detector.

3. A laser radar device as in claim 1 wherein said device is adapted to determine speed of said targets at many locations along the length of said laser beam.

4. A laser radar device as in claim 3 wherein said device is adapted to measure windspeed at many locations along the length of said laser beam.

5. A laser radar device as in claim 1 wherein said laser beam is a continuous laser beam, and further comprising a telescope light detection system which collects light from a particular location in front of the telescope.

6. A laser radar device as in claim 1 wherein said atomic vapor is chosen from a group consisting of lithium, sodium, potassium, rubidium and cesium or other elements or molecules.

7. A laser radar device as in claim 1 wherein said metal vapor is potassium.

8. A speed determining laser radar device as in claim 1 wherein said target or targets are aerosols in air.

* * * * *